(12) United States Patent
Higa (10) Patent No.: US 8,908,775 B1
(45) Date of Patent: Dec. 9, 2014

(54) TECHNIQUES FOR VIDEO DATA ENCODING

(75) Inventor: Anthony Norihisa Higa, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 742 days.

(21) Appl. No.: 13/076,363

(22) Filed: Mar. 30, 2011

(51) Int. Cl.
*H04N 11/04* (2006.01)

(52) U.S. Cl.
USPC .................................. 375/240.26

(58) Field of Classification Search
USPC ............ 382/154, 284; 715/719; 345/420, 428
See application file for complete search history.

(56) References Cited

U.S. PATENT DOCUMENTS

| | | | | |
|---|---|---|---|---|
| 6,072,498 | A * | 6/2000 | Brittain et al. | 345/428 |
| 2006/0120593 | A1 * | 6/2006 | Oshino | 382/154 |
| 2007/0047643 | A1 * | 3/2007 | Erlandson | 375/240.01 |
| 2007/0122059 | A1 * | 5/2007 | Ejiri et al. | 382/284 |
| 2009/0327893 | A1 * | 12/2009 | Terry et al. | 715/719 |
| 2011/0248995 | A1 * | 10/2011 | Vaughan et al. | 345/420 |
| 2012/0120054 | A1 * | 5/2012 | Sandrew et al. | 345/419 |

* cited by examiner

*Primary Examiner* — Tung Vo
*Assistant Examiner* — Rowina Cattungal
(74) *Attorney, Agent, or Firm* — Kilpatrick Townsend & Stockton LLP (57) ABSTRACT

The techniques for encoding video content are disclosed. In an online game environment, the techniques include obtaining information for a first and second successive frames of video content and information for a position of a virtual camera associated with each frame, determining virtual camera translation information based on the positions of the virtual camera, determining a projected movement between the frames of an object included in each frame, determining the portion of the first frame to be excluded from the second frame and a new portion of the second frame, and providing the determined encoded information for a reconstruction of the second frame based on the provided information.

28 Claims, 9 Drawing Sheets

TECHNIQUES FOR VIDEO DATA ENCODING

BACKGROUND OF THE INVENTION

Video encoding, or video compression, is technique for reducing the quantity of data used to represent digital video images, usually comprising a sequence of video frames, and is a combination of spatial image compression and temporal motion compensation. Ordinarily, a video encoding scheme is applied to encode video data at a content provider (e.g., a video data server) and the encoded data is delivered to a client (e.g., a client computing device), where the delivered data is decoded and a corresponding image is displayed to a user. Typically, video encoding is based on a frame-by-frame comparison, where two adjacent video frames (e.g., a current frame and a next frame) are compared at a server and the determined video data differences, if any, are transmitted to a client configured to reconstruct the next frame. When substantial differences between the frames are detected, a video compression scheme must send more data to keep up with the larger number of pixels (data units comprising a video image) that are changing from the current frame to the next.

Further, in order to maintain an acceptable level of quality, conventional frame-by-frame analysis may involve more than just two adjacent frames (for example, analyzing sixteen frames at a time) which may require substantial processor and memory resources. Also, conventional frame-to-frame analysis may cause lags in image delivery, particularly in real-time video or computer game environment. If video content includes an explosion, flames, a flock of birds, or any other image with a great deal of high-frequency detail, image quality from the current frame to the next frame may decrease and ultimately may be compromised.

DETAILED DESCRIPTION OF THE INVENTION

Techniques are described in accordance with various embodiments for the encoding and/or decoding of video data. In various embodiments, video data encoding utilizes information relating to camera movement during a time period between at least a current frame and a next frame. Various techniques further utilize information defining a video content object location in the next frame relative to the object location in the current frame. Such techniques avoid the need for a frame-by-frame comparison as in conventional video encoding techniques, where two adjacent video frames are compared and the determined video data differences, if any, are transmitted to a decoder configured to reconstruct the next frame based on the current frame and the determined differences between the current and the next frames.

Camera movement information (be it a video camera or "virtual camera") may be utilized to encode differences between two subsequent frames in order to reconstruct a frame based on a previous frame and a camera movement that occurred between frames. In an embodiment, a camera position may shift between a current frame and a next frame. Based on a new camera position, it is possible to determine a portion of the current frame that is included in the next frame and therefore may be used for a reconstruction of the next frame. Knowing the camera movement parameters (e.g., direction, speed, and/or angle), it is possible to determine a location of the portion of the current frame in the new frame. Essentially, a portion of the current frame "translates" into the new frame according to the camera translation (movement) that occurred between the frames. Thus, it is possible to encode and utilize the translation information corresponding to the portion of the current frame for subsequent reconstruction of the next frame based at least on the portion of the current frame and the translation parameters corresponding to the known camera movement between frames.

Furthermore, objects included in a frame may also move between frames. Information indicating object movement (translation) between the frames may also be captured, encoded, and used for the reconstruction of the next frame by a decoder for rendering the frame on a client (user) device. Additional differences between the current and next frame (e.g., a portion of the next frame that was not included in the current frame) may be determined and corresponding information may be encoded and subsequently used in the reconstruction of the next frame.

Figure 1:
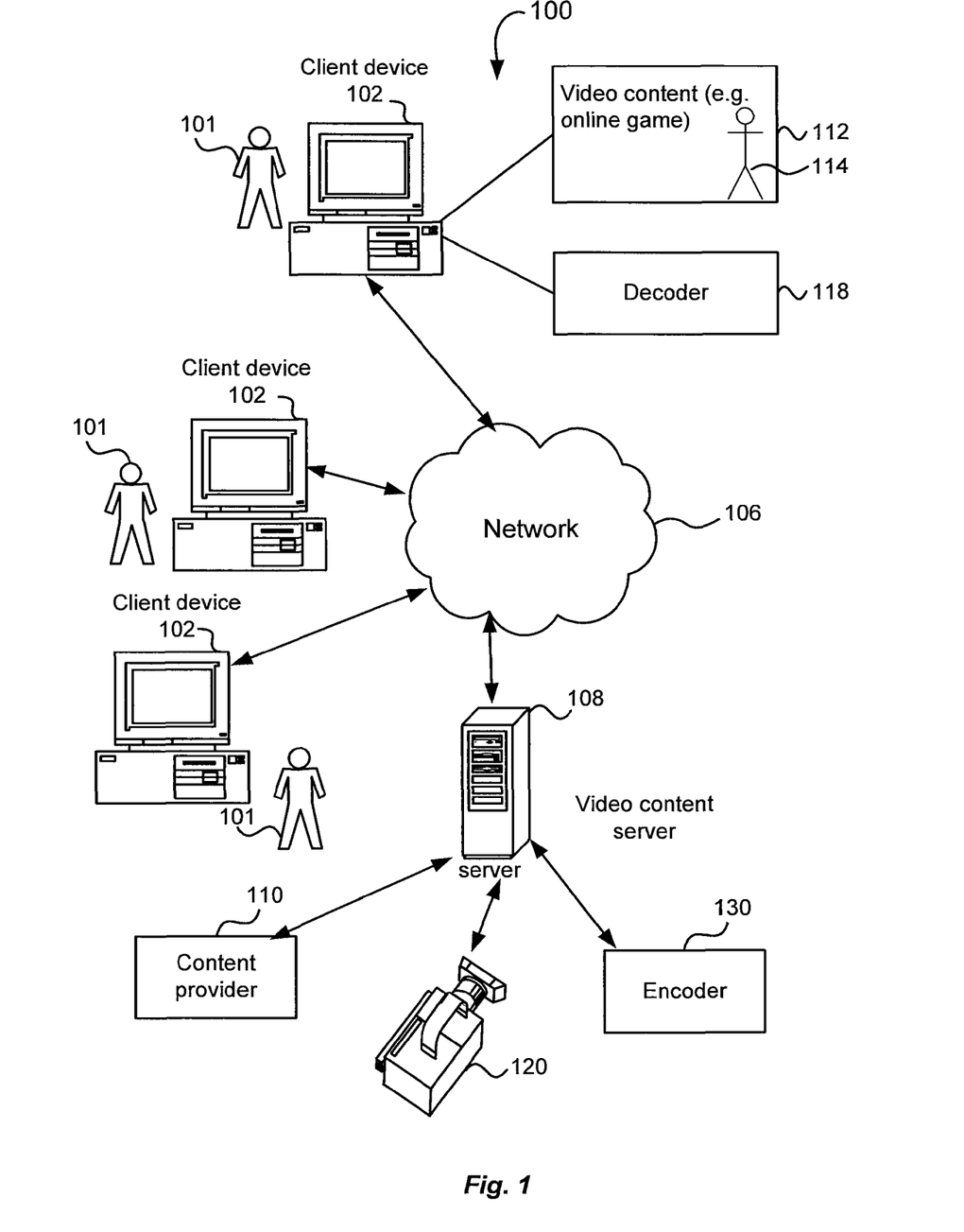
FIG. 1 illustrates an environment in which various embodiments may be practiced.

FIG. 1 illustrates an example environment 100 in which various embodiments described herein may be practiced. The environment 100 may be realized utilizing one or more of the components of the environment described below in connection with FIG. 9. The environment 100, in an embodiment, includes a plurality of users 101 that utilize a network, such as the Internet 106, to browse content, including video content, of various content providers using client devices (in an embodiment, client computing devices) 102. The environment 100 may utilize the Internet as a network; however, it should be understood that other networks may be used as an alternative to or in addition to the Internet. Examples of other networks include mobile networks, intranets, and generally any suitable communications network. In an embodiment, users 101 may access video content provided by content providers that is already stored on their computing device.

As shown in FIG. 1, the environment 100 includes a content server 108 that may be operated by a content provider 110. In the example illustrated in FIG. 1, the content provider 110, via the content server 108, offers an online computer game 112 to be rendered on a client device 102. While the example environment 100 shows the online computer game 112 for the purpose of illustration, it should be understood that any type of video content may be included in the environment 100 or variations thereof. Content may be provided in various ways, such as through an application interface or through other mechanisms. The environment 100 further includes a camera (in an embodiment, a "virtual camera") 120 associated with the content server 108. In an embodiment, the "virtual camera" 120 is configured to provide a "viewpoint" information for each video frame rendered to the client device 102.

In another embodiment, the camera 120 is a "live" camera used for transmitting a live broadcast to users and the camera location relative to each video frame may also be established as described above. In the above examples, client devices 102 may not be limited to computing devices. Client devices may encompass TV sets, smart phones and other devices suitable for decoding and rendering video images to the users 101. The environment 100 further includes an encoder 130 associated with the content server 108. The encoder 130 is configured to encode video content in accordance with the embodiments further described in reference to FIGS. 2-8.

Conventional video encoding techniques involve a frame-by-frame analysis. Typically, video encoding or video compression operates on square-shaped groups of neighboring pixels, often called macro-blocks. These pixel groups or blocks of pixels are compared from one frame to the next and the video compression codec (encode/decode scheme) sends only the differences within those blocks. The conventional encoding technique works well if the video content delivered in video frames has no or little motion. A still frame of text, for example, can be repeated with very little transmitted data. Typically, however, video content contains moving objects, changing scenery, and the like that change from video frame to video frame.

Differences between frames may occur for a variety of reasons. For example, an object may move, e.g., change its position in a new frame relative to the object's position in a previous frame. Furthermore, a camera that records a video may change its own position, e.g., shift up and down, move from left to right, and/or change its angle.

Figure 2:
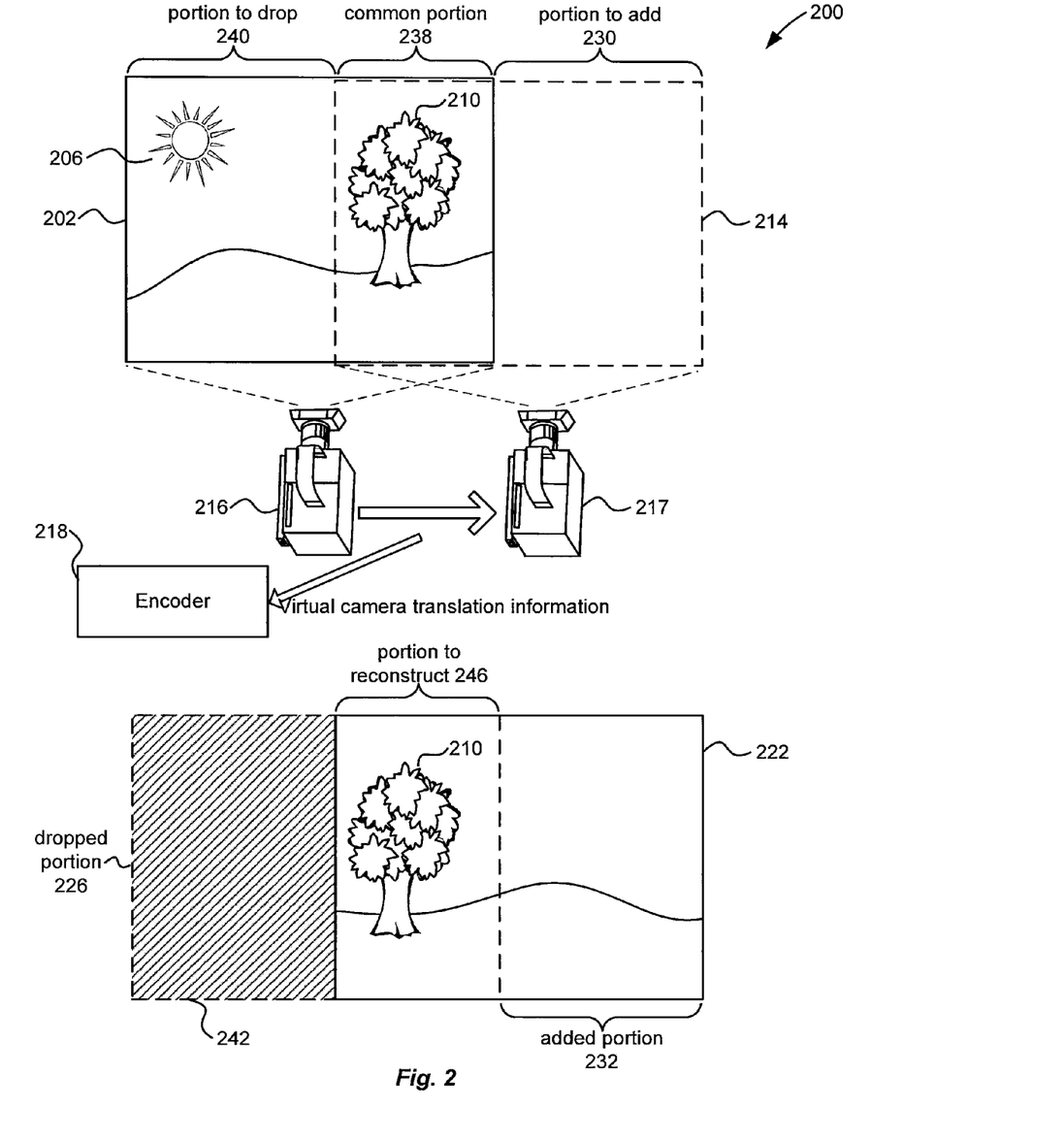
FIG. 2 illustrates an example of two adjacent video frames containing video content to be encoded in accordance with various embodiments.
Figure 3:
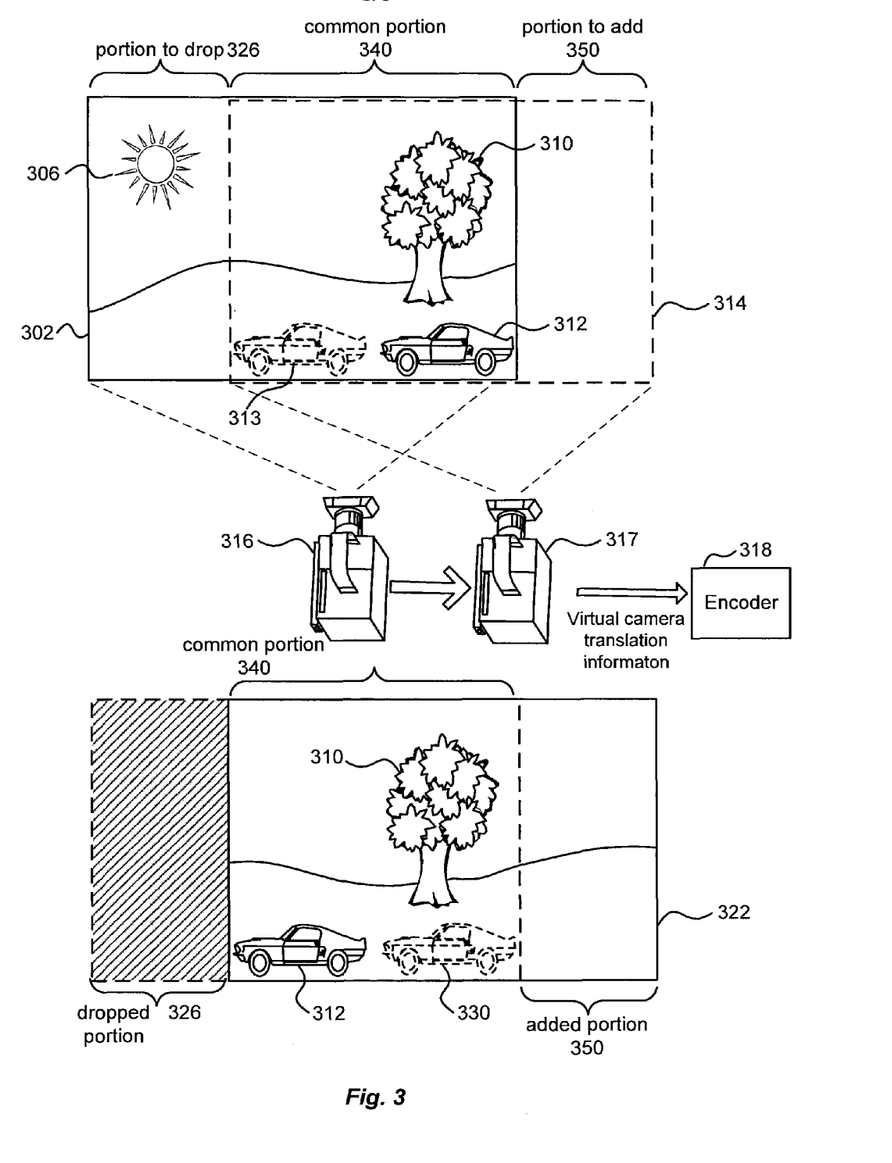
FIG. 3 illustrates an example of two adjacent video frames containing video content to be encoded in accordance with various embodiments.

In an embodiment as illustrated by FIG. 1, the users 101 may interact with content 112 in order, for example, to play a computer game 112 offered by the content provider 110. Typically, video games include video content (e.g., video images of a variety of objects) generated by video game software and rendered on a user video device. For example, a video game may include a landscape or a cityscape as a background and an automobile controlled by a user via a user interface as illustrated in FIGS. 2-3 and described below. The computer game 112 shown in FIG. 1 includes at least one virtual representation of an object, i.e., avatar 114.

Typically, generating and rendering video images (e.g., images associated with a computer game) involve 3D computer graphics that use a three-dimensional representation of geometric data stored at the computer for the purposes of performing calculations and rendering 2D images. Rendering a video image is the process of generating an image from a "scene file" by means of computer programs. A scene file may contain objects in a strictly defined language or data structure; it may also contain geometry, viewpoint, texture, lighting, and shading information as a description of the virtual scene. The data contained in the scene file is then passed to a rendering program (renderer) to be processed and output to a digital image or raster graphics image file. Though the technical details of rendering methods vary, the general challenges to overcome in producing a 2D image from a 3D representation stored in a scene file are outlined as the graphics pipeline along a rendering device, such as a Graphics Processing Unit (GPU).

Rendering 3D images using 2D data in a video game may be compared to rendering a video broadcast. For example, a computer-game related image ("frame") of a 3D landscape that a user 101 views on his/her video device 102 may be considered as taken through an imaginary camera point, so that the user sees the landscape as if it was "shot" by a "virtual camera" 120 from the camera point chosen by a game developer. For example, a "first-person shooter" video game centers the gameplay around projectile weapon-based combat through the first person's perspective; i.e., the player experiences the action through the eyes of a protagonist similar to an action scene viewed through a "virtual camera." In an embodiment, a "virtual camera" "viewpoint" may be described as the camera coordinates and/or direction in a 3D space that is defined by a video frame that may be viewed from the camera "viewpoint."

FIG. 2 illustrates a diagrammatic representation of two adjacent video frames taken by a camera (a video camera or "virtual camera"). The diagram 200 includes a frame 202 taken by a camera 216. The frame 202 includes elements of a landscape, such as the sun 206 and a tree 210. The diagram 200 further illustrates shifting of the camera 216 to the right (as illustrated by an arrow) and taking a new position 217. Element 214 marked in the dotted line represents the next frame taken by camera 216 after it moved (shifted) to the right to the position 217.

By way of example, in a video game environment illustrated in FIG. 1, if a "virtual camera" shifts a few pixels (or pixel columns) comprising a frame to the right between the current frame and the next frame, a corresponding pixel velocity may be determined and assigned to pixels comprising a portion of the current frame that "translates" into the next frame. Further, the pixels comprising a part of the left side of the current frame that are no longer included in the next frame because of the camera shift to the right may be determined and "dropped" from the next frame when it is reconstructed on the client side. Also, the pixels comprising a part of the right side that need to be added to the right side of the next frame due to a camera shifting to the right may be determined from the boundaries of the next frame relative to the boundaries of the current frame on the server side and supplied to the decoder on the client side to be used for the reconstruction of the next frame.

Accordingly, as shown in FIG. 2, the frame 214 still includes the tree 210 but no longer includes the sun 206 as the sun is in the portion 240 of the frame 202 that is not included in the new frame 214 due to the camera viewpoint change. The portion 230 of the frame 214 is the new portion of the frame 230 that was not included in the "current" frame 202.

Element 222 shows in detail the next frame taken by camera 216 after it was shifted to the new position 217. As illustrated in frame 222, the tree 210 is now showing on the left side of the frame 222 and the frame includes the added portion 232 that was not included in the frame 202, and was added to the frame 222 because of the camera shift to the right. The dotted-line element 242 that overlaps with the frame 222 is a boundary of the current frame 202 shown in relation to the new frame 222. The "portion to reconstruct" 246 of the frame 222 (shown in the frame 202 as a "common portion" 238) belongs to both frames. The "virtual camera" translation information comprising the data related to the camera movement (e.g., coordinates of the camera positions and the camera direction or angle) may be provided to an encoder 218. The new frame may be encoded by using the "virtual camera" translation information for the common portion 238 and information defining the "dropped portion" 226 (corresponding to the "portion to drop" 240) and the "added portion" 232 (corresponding to the "portion to add" 230).

In one embodiment, it may be beneficial to store (e.g., cache) the "dropped portion" 226 so as to be accessible by the encoder if needed, at least for a determined period of time or determined number of frames. For example, the camera, after shifting to the right, may subsequently (one or more frames later) shift back to the left, thus again covering at least a part of the dropped portion. In this case, the data defining the "dropped portion" may be utilized for encoding a part of the dropped portion that again appeared in a new frame.

FIG. 3 illustrates another diagrammatic representation of two adjacent video frames taken by a camera (a video camera or "virtual camera" as described above). The diagram 300 includes the frame 302 taken by camera 316 in which, in addition to the elements of the landscape (the sun 306 and tree 310), there is also shown a moving object (a car 312). Similar to FIG. 2, the current frame 302 shows portion 326 that is not included in the next frame 314 (shown adjacent to a next frame 322 with dotted-line boundaries) and the portion 350 to add to the next frame 314 when the camera 316 shifts to the right to the position 317.

As discussed above, both a camera and an object in the frame may move within the time period between frames. In an example illustrated in FIG. 3, the camera 316 may shift to the right from a current frame to next frame, while the object 312 may move to the left at the same time. In that case, the camera movement information and the object movement information may be obtained, and relative velocity may be derived from the camera movement information and the object movement information. For example, if a camera moves 3 pixel columns to the right relative to the current frame, and the object in the frame moves 5 pixel columns to the left relative to the current frame, a total scene movement is 8 pixel columns with respect to the car, but only 3 pixel columns with respect to the background of the frame (e.g., landscape or cityscape).

Accordingly, as shown in FIG. 3, in addition to the elements of landscape that should be included in the next frame 314 taken from the viewpoint 317 by the camera, the car 312 has moved in the time period between the frame 302 and the next frame 314 and assumed a new position as shown by the contour 313. The contour of the car 313 illustrates a new position of the car 312 in the middle of the frame 302 (i.e., assuming that the camera 316 remains still).

The next frame 314 is illustrated in greater detail as an element 322, which includes the common portion 340 with the frame 302. The portion 326 of the frame 302 is not included in the next frame 322. The common portion 340 includes the car in its new position (corresponding to the contour 313 in the frame 302). The common portion further includes a contour of the car 330 corresponding to the initial position of the car 312 in the frame 302. The common portion 340 may be reconstructed as a part of new frame based on the known camera translation information (sent to encoder 318) and the known or predicted movement of the car 312 from one frame to the next. The position vacated by the car 312 and illustrated by the contour 330 may be filled with the video data defining the part of the landscape occupied by the car in the frame 302 and vacated in the frame 322. As illustrated in the diagram 300, the next frame 322 may be reconstructed using the camera translation information to reconstruct the common portion 340, a portion of the landscape 330 that is vacated by the car 312, and the information regarding the added portion 350 and the dropped portion 326.

In one embodiment, the information assembled as described above may be provided to a decoder associated with a client (e.g., user video device) in order to efficiently and correctly reconstruct the next frame 322 from the current frame 302. The decoder may be configured to hold (e.g., store) information associated with the current frame. The decoder may receive the provided information, decode the camera translation information and object translation information, reconstruct the common for current and next frames portion, and append the next frame with the portion of the landscape 330 that is vacated by the car 312, add portion 350 and drop portion 326. The next frame, thus reconstructed, may then be rendered on the user video device. The process of encoding the information needed for the reconstruction of the next frame will be discussed in greater detail in reference to FIGS. 4-7.

Figure 6:
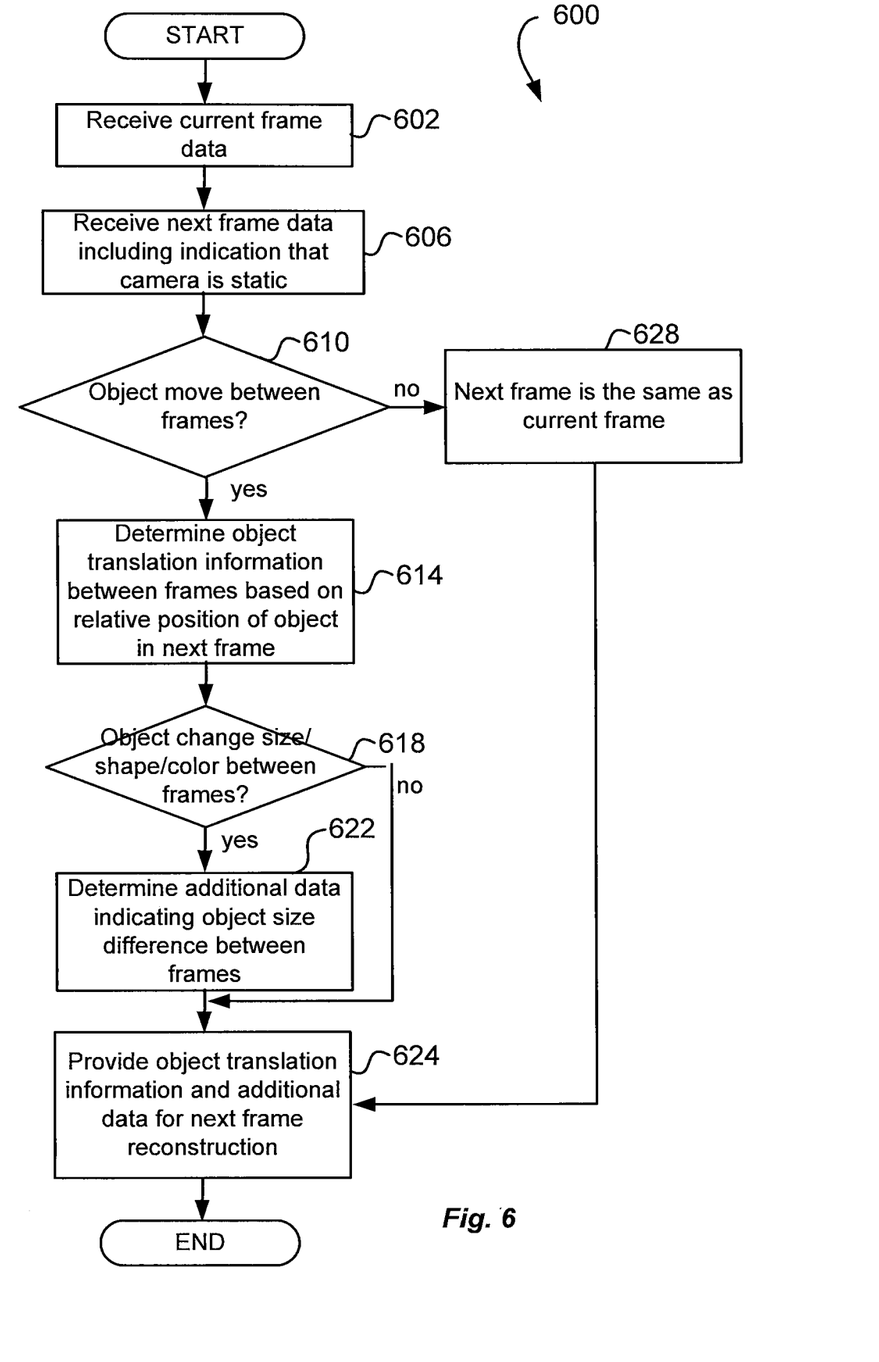
FIG. 6 illustrates a process flow diagram for encoding a frame of video content in accordance with yet another embodiment.
Figure 7:
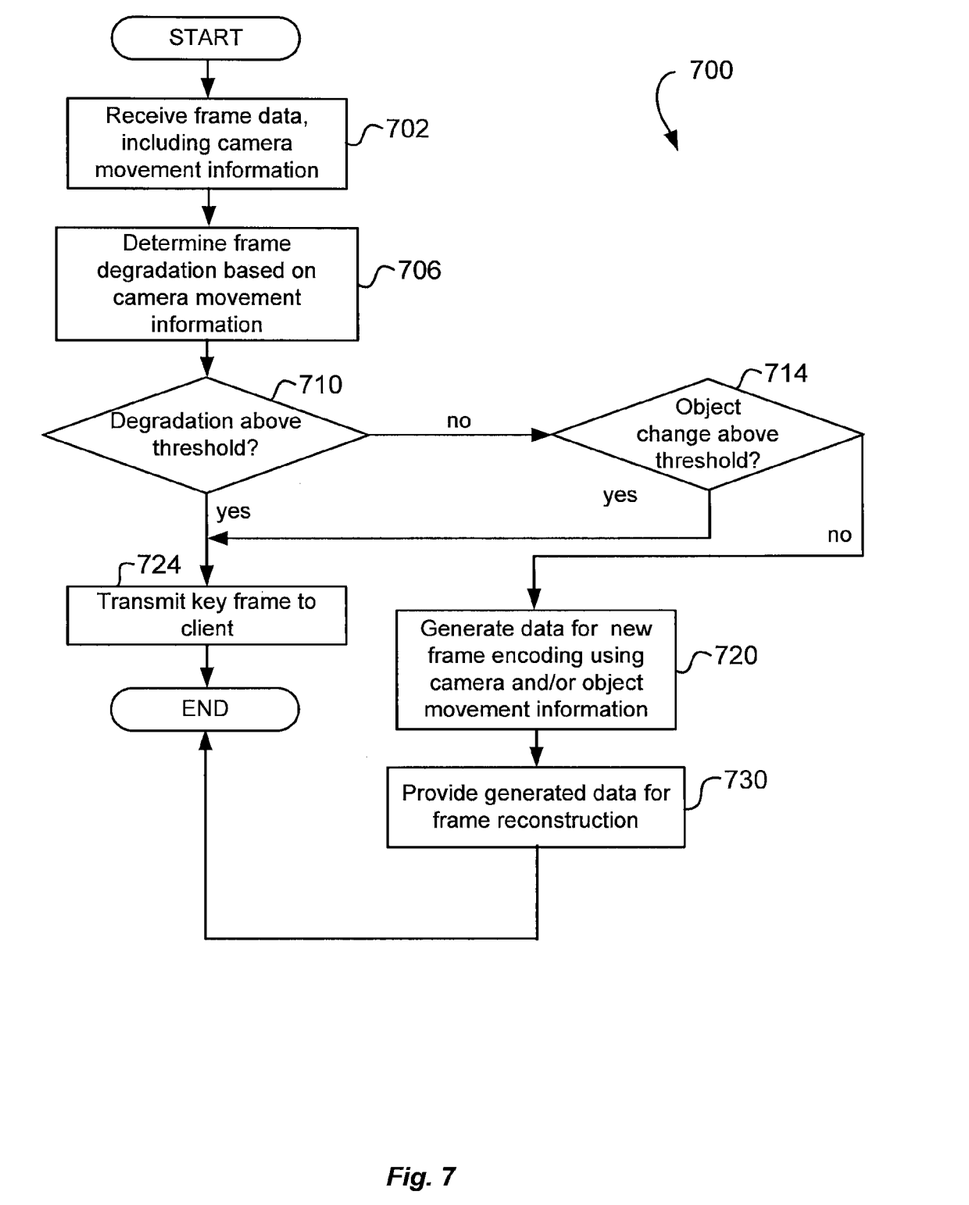
FIG. 7 illustrates a process flow diagram for encoding a frame of video content in accordance with yet another embodiment.
Figure 8:
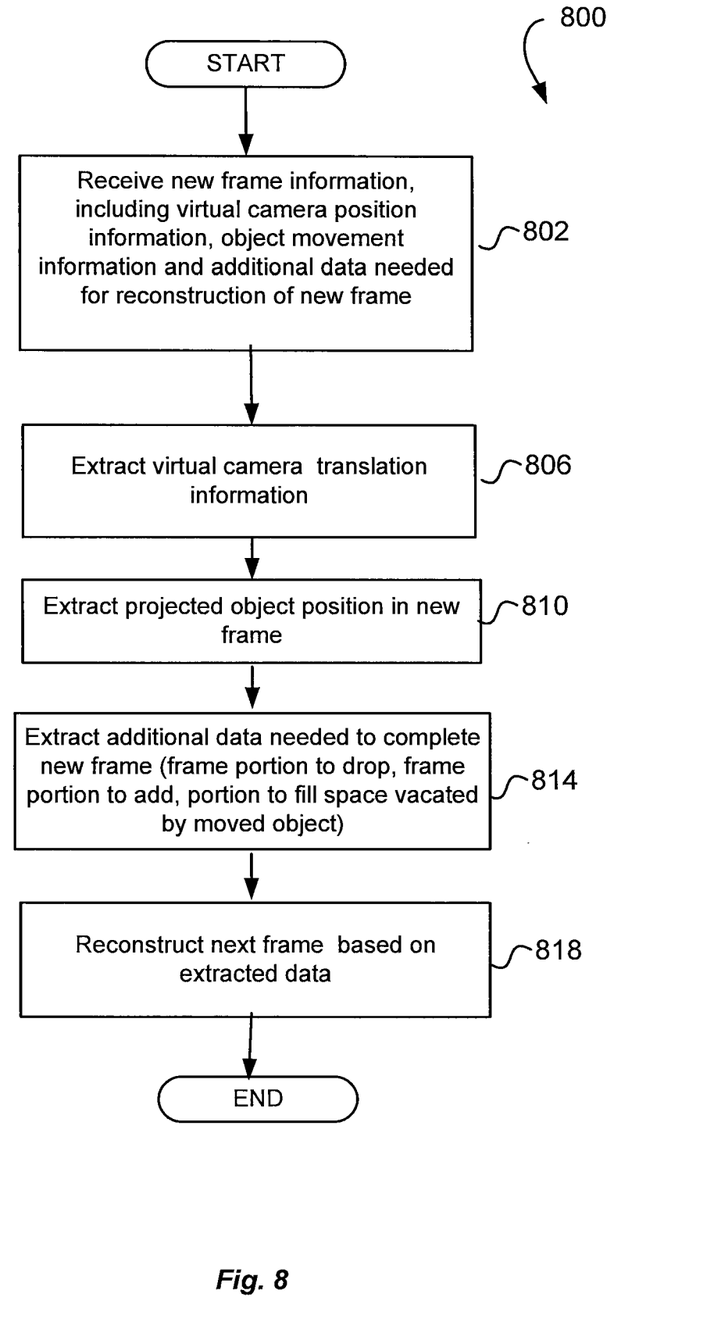
FIG. 8 illustrates a process flow diagram for decoding a frame of video content in accordance with an embodiment.

FIGS. 4-7 illustrate process flow diagrams for the operation or utilization of various elements of a system such as those described above in reference to FIGS. 1-3 and/or in reference to FIG. 8. Those skilled in the art will appreciate that the steps in the process-flow diagram of FIGS. 4-7 described below may be altered in a variety of ways. For example, the order of the steps may be changed, sub-steps may be performed in parallel, shown steps may be amended, other steps may be included, and the like.

Figure 4:
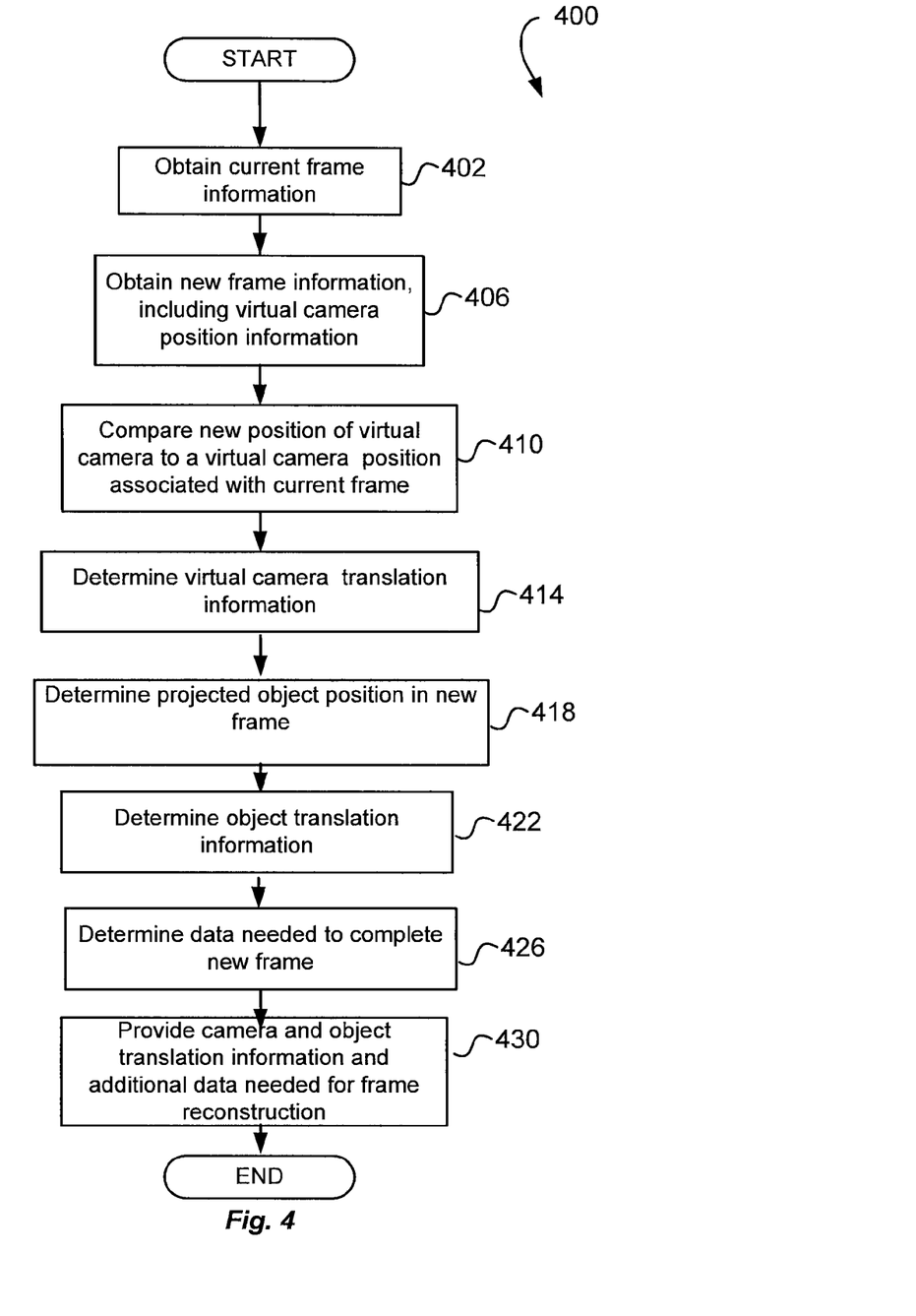
FIG. 4 illustrates a process flow diagram for encoding a frame of video content in accordance with an embodiment.

FIG. 4 illustrates an example process-flow diagram for encoding a video frame for video content comprising a plurality of successive video frames based at least in part upon camera movement information and object movement information between frames. The process 400 begins at block 402, where information related to a current frame is obtained (e.g., retrieved) by a server providing video content. At block 406, information related to a new frame is obtained (e.g., retrieved) by the server. In an embodiment, the frame information may contain data related to the camera position information associated with the frame (e.g., data describing a camera "viewpoint" in relation to the frame that corresponds to the camera coordinates and/or direction discussed above). At block 410, the position of the virtual camera associated with the new frame is compared to the position of the camera associated with the current frame.

In real-time broadcast environment, for example, a camera used for recording video content may contain and, if necessary, provide its movement information (also referred hereinafter as "translation information"). For example, a camera may have a mechanism to measure its angle relative to a horizon (e.g., a gyroscope) and provide the taken measurement if needed. The camera movement may be tracked using a "camera tracking" technique known in the film industry. For example, camera tracking technique may involve placing point markers in the scene that help determine the camera position in 3D space at all times. In general, a camera position in 3D space may be determined and corresponding data injected into, and delivered along with, the recorded video data.

In video game environment, as in a "live" video broadcast environment, a "virtual camera movement" may be tracked. For example, Microsoft DirectX®, a collection of application programming interfaces (APIs) for handling tasks related to game programming and video, has a capability to provide data associated with a change of a "virtual camera" viewpoint in a game, and therefore effectively provide information related to a "virtual camera movement" ("camera translation") from one frame to another. Accordingly, in an embodiment, known camera movement information (be it a video camera or "virtual camera") may be utilized to determine differences between two subsequent frames in order to reconstruct a frame based on a previous frame and a camera movement that occurred between frames.

Referring back to FIG. 4, at block 414, the camera movement (translation) information is determined based on the new camera position relative to the camera's previous position as described above. By knowing the virtual camera movement parameters (e.g., direction, speed, and/or angle), it is possible to determine how the portion of the current frame that is present in the new frame "translates" into the new frame. The translation information may include pixel velocities assigned to each pixel comprising the common portion of the frame.

At block 418, a projected object position in the new frame is determined. For example, in an embodiment, video game data may contain information regarding the object movement and inform the encoder accordingly. Video game software may be configured such that the object movement information is scripted and therefore may be accessible. As another example, a user may control object movements and the movement information may be derived from the user's movement of an object. Furthermore, the object's size, shape, color, and other characteristics may change between frames and may also be approximated based on one or more "historic" frames preceding the next frame. In summary, there are numerous ways to educate the encoder with the object's expected position in the next frame vis-à-vis the object's position in the current frame. Having an approximation of what an object should look like in the next frame relative to the current frame, it is possible to transmit to the decoder the movement (translation) information of an object along with the differences between the object's shape and size in the current and next frames in order.

Thus, information related to an object movement from the current frame to the next frame may be obtained in a number of different ways. In one embodiment, this information may be derived from the known movement of the object between a frame previous to the current frame and a current frame. For example, an object may change its position (and/or direction, size, or color) between a previous frame and a current frame. Based on that information, it is possible to approximate the object position and other characteristics in the next frame relative to the current frame. Based on the above determination, at block 422, the object translation information is determined. As described above, this information may include pixel velocities, size, and color characteristics that are assigned to the data set comprising an object in the current frame so that the object "translates" correctly into the new frame. At block 426, additional data necessary to complete the reconstruction of the new frame is determined as described above in reference to FIGS. 2 and 3. Finally, at block 430, the determined and encoded translation information and additional data may be provided for subsequent frame reconstruction. The process 400 then ends.

Figure 5:
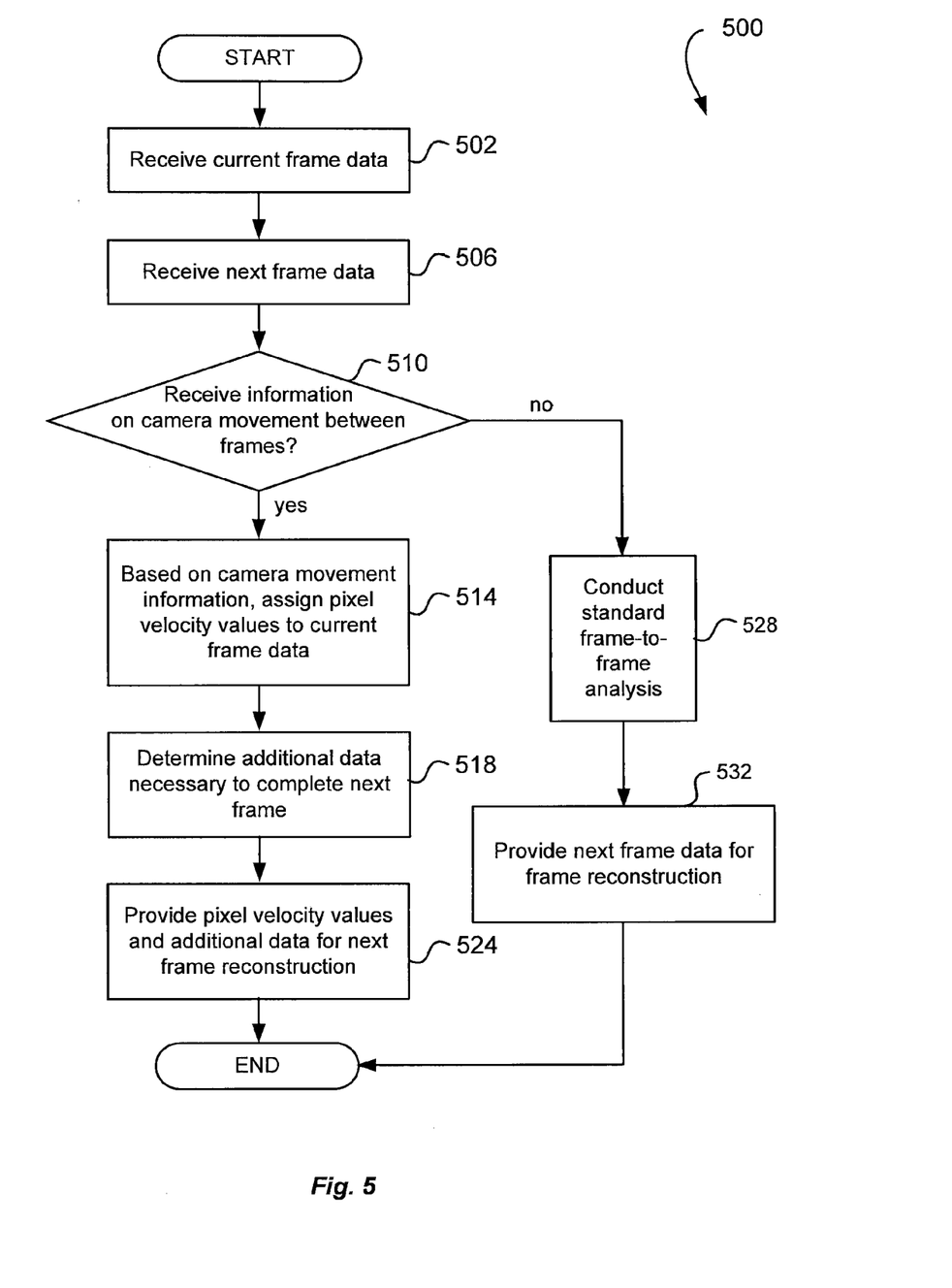
FIG. 5 illustrates a process flow diagram for encoding a frame of video content in accordance with another embodiment.

FIG. 5 illustrates a process-flow diagram for encoding the video frame of video content comprising a plurality of successive video frames based on the camera movement information. In this illustrative embodiment, it is assumed that the objects in the frame are still and do not move during the time period between frames. The process 500 begins at block 502 where the current frame data is received. At block 506, the next frame data is received. At determination block 510, it is determined whether the information for the camera movement between frames is received.

As discussed above, a camera position may shift between a current frame and a next frame. Based on a new position of a camera, it is possible to determine a boundary of the next frame relative to that of the current frame and accordingly determine a portion of the current frame that is included in the next frame. Specifically, knowing the virtual camera movement parameters (e.g., direction, speed, and/or angle), it is possible to determine a location of the portion of the current frame in the new frame. Essentially, the portion of the current frame "translates" into the new frame according to the camera translation (movement) that occurred between the frames. Thus, the translation information corresponding to the portion of the current frame may be supplied to a decoder for reconstruction of the next frame based at least on the portion of the current frame and the translation parameters corresponding to the known camera movement between frames.

Referring back to FIG. 5, if at decision block 510 it is determined that no information for the camera movement between frames is received, at block 528, the new frame information is determined using other techniques, e.g., a conventional frame-to-frame analysis as described above. Then, at block 532, the next frame data obtained as a result of the frame-to-frame analysis is transmitted to a client device. If the information for the camera movement between frames is received, at block 514, pixel velocity values are based on the camera movement information and assigned to a portion of the current frame that "translates" into the next frame as described above. At block 518, additional data necessary to complete next frame as described above in relation to FIGS. 2 and 3 is determined. At block 524, the pixel velocity values and additional data are provided for reconstruction of the next frame. The process 500 then ends.

FIG. 6 illustrates a process-flow diagram for encoding a video frame of video content comprising a plurality of successive video frames based on the object movement information between frames. In this illustrative embodiment, it is assumed that the camera remains still between the current frame and the next frame. Typically, an object movement around the scene may not be substantial, but rather incremental. Accordingly, the pixels comprising a moving object in the frame (e.g., a car 312 illustrated in FIG. 3) may be assigned velocity values based on the anticipated change between the position of the object in the next frame relative to the current frame. Information related to an object movement may be obtained in a number of different ways. In one embodiment, this information may be derived from the known movement of the object between a frame previous to current frame and a current frame. For example, a car might change its position and/or direction between a previous frame and a current frame. Based on that information, it is possible to approximate a car movement in the next frame relative to a current frame. Generally, the object movement information may be approximated based on the object location in one or more "historic" frames preceding the next frame.

The process 600 begins at block 602 where the current frame data is received. At block 606, the next frame data is received that includes the indication that the camera is still or static. At determination block 610, it is determined whether the object moved between frames. If the object moved, at block 614, the object movement (translation) information is determined as discussed above in reference to FIGS. 3 and 4. At determination block 618, it is determined whether the object changed its characteristics (e.g., size, shape, angle, or color) between frames. If any of these characteristics changed, at block 622, additional data is determined that reflects the object differences between the frames.

As discussed above, objects in a frame may move, turn, change shapes, and the like. For example, a car (e.g., car 312) included in a video image (or in a live video footage) may move a certain distance in the frame during the time period between the current frame and next frame. Information indicating object movement (translation) between the frames may also be captured and used for the reconstruction of the next frame on the client side. In an embodiment related to a video game environment, a renderer may inform the encoder with the information related to a projected movement of an object from a current frame to the next frame.

Referring back to FIG. 6, at block 624, the object translation information and additional data determined at block 614 and 622 are provided for next frame reconstruction. If the object did not move between frames, at block 628, it is determined that the next frame is practically the same as the current frame because the camera did not move either. The process 600 then ends.

FIG. 7 illustrates another example of a process-flow diagram for encoding the video frame of video content comprising a plurality of successive video frames based on the camera movement information and the object movement information between frames. The process 700 begins at block 702 where the frame data is received that includes camera movement information. At block 706, the expected frame degradation is determined based on the camera movement information. For example, the camera may have turned 180 degrees from the current frame to the next frame or otherwise changed its position such that the reconstruction of the new frame based on the current frame does not make sense because only a small portion of the current frame (or none at all) may be translated into the new frame.

At determination block 710, it is determined whether the frame degradation is above threshold. If it is determined that degradation is below threshold, at determination block 714, it is determined whether the object change between frames is above threshold. If the degradation due to the camera movement is determined to be above threshold or the object has been determined to change above predetermined threshold, the process moves to block 724 where the key frame is transmitted to client as the next frame. If the frame degradation due to the camera movement is determined to be below threshold and the object change is determined to be below threshold, at block 720, the data for new frame encoding is generated using the camera movement information and projected object movement information as described above in reference to FIGS. 2-6. Finally, at block 730, the generated data may be assembled and provided for frame reconstruction. The process 700 then ends.

FIG. 8 illustrates a process-flow diagram illustrating an example process for decoding a video frame of video content encoding using one of the processes discussed herein. As discussed, an encoded video file can include a plurality of successive video frames and information pertaining to the movement of at least one object between successive frames. In one embodiment, the information regarding a current frame and a next frame in the encoded file may be provided to a client device, such as a user video device. In an embodiment, a client device may have an associated decoder and/or utilize a decoding algorithm configured to reconstruct the next frame based on the current frame, stored on the client device and accessible by the decoder, and information regarding the next frame provided by an encoder.

The process 800 begins at block 802, where the decoder may receive the provided new frame information including virtual camera position information and additional data needed for reconstruction of new frame. At block 806, the camera translation information is extracted from the received data. At block 810, a projected object position in a new frame is extracted from the received data. At block 814, additional data needed to complete new frame, for example, information defining a current frame portion that should not be included in the next frame, information defining a frame portion to be added to the new frame, and information defining a portion to fill the space vacated by the moved object, is extracted from the received data. Finally, at block 818, the extracted data is used to reconstruct the next frame based on the extracted information and the stored current frame and to render the reconstructed new frame to the user on the user video device. At least this portion of the process 800 then ends.

Figure 9:
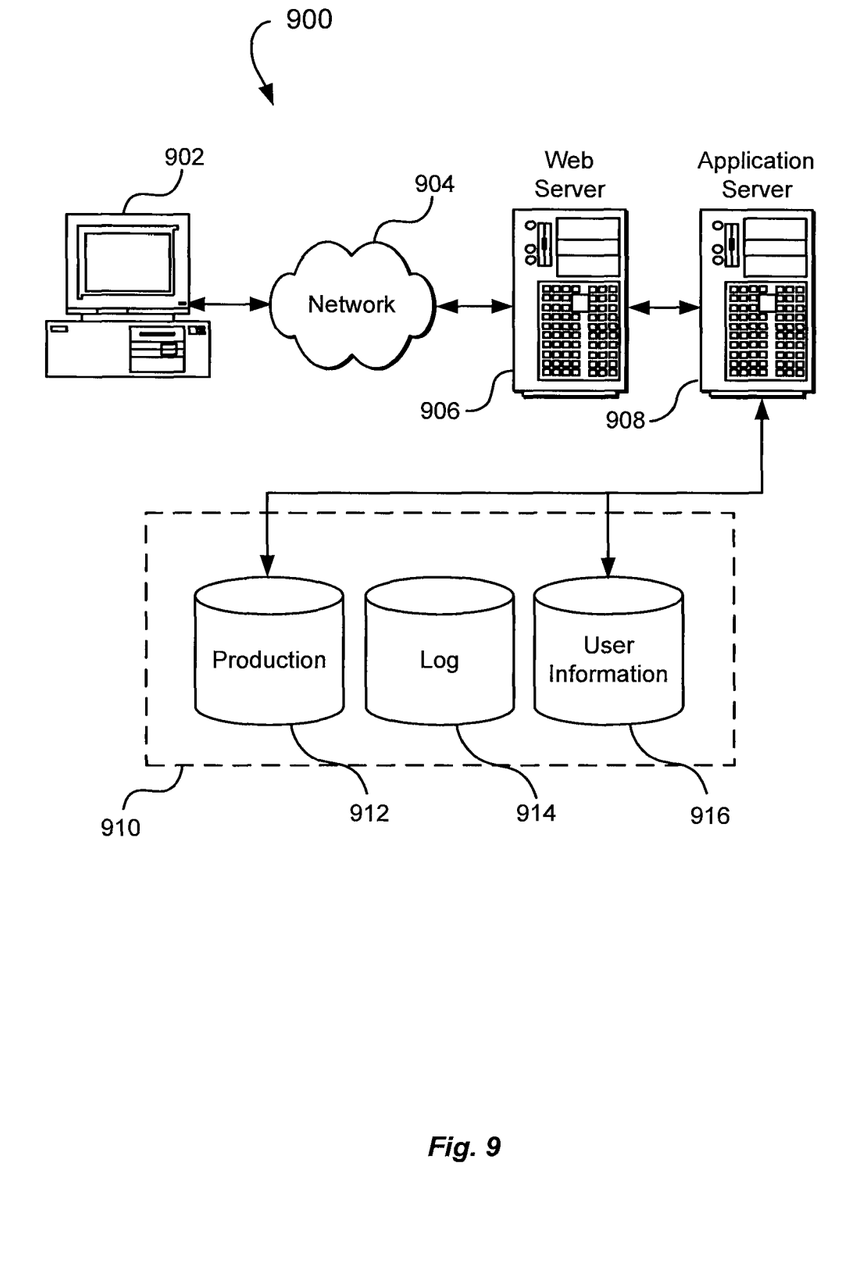
FIG. 9 illustrates an environment in which various embodiments can be implemented.

FIG. 9 illustrates an example of an environment 900 for implementing aspects in accordance with various embodiments. As will be appreciated, although a Web-based environment is used for purposes of explanation, different environments may be used, as appropriate, to implement various embodiments. The environment 900 includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device (e.g., applications for handling tasks related to game programming and video), handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, generating statistics, and other such purposes. It should be understood that there can be many other aspects that may need to be stored in the data store, such as page image information and access right information, which can be stored in any of the above-listed mechanisms as appropriate or in additional mechanisms in the data store 910. The data store 910 is operable, through logic associated therewith, to receive instructions from the application server 908 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 902. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limited to the scope of the disclosure.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for encoding video content in a video game environment, comprising:
   obtaining, by one or more computer systems, a first data set defining a first frame of a plurality of frames of video content, the first data set including information associated with a first position of a virtual camera and defining a first boundary of the first frame, the first data set further including a subset defining at least one object within the first frame;
   obtaining a second data set defining a second frame of video content immediately succeeding the first frame in the plurality of frames, the second set of data including information associated with a second position of the virtual camera and defining a second boundary of the second frame;
   determining a first portion of the first frame at least partially overlapping the second frame based at least in part upon virtual camera translation information, the virtual camera translation information reflecting movement of the virtual camera between the first and second positions;
   determining a second portion of the first frame that does not overlap with the second frame and a third portion of the second frame that does not overlap with the first frame based on a difference between the first and second boundaries;
   determining object translation information based at least in part upon a projected movement of the at least one object between the first frame and the second frame and upon the virtual camera translation information;
   encoding, by the one or more computer systems, a video file with information defining the first portion of the first frame, the second portion of the first frame, and the third portion of the second frame based upon the virtual camera translation information and the object translation information
   determining a frame degradation based on at least camera movement information;
   determining whether the frame degradation is above a threshold;
   when the frame degradation is above the threshold, transmitting the first frame as the second frame; and
   when the frame degradation is below the threshold, generating data for new frame encoding based at least in part on the camera or object movement information and reconstructing the plurality of frames of video content based at least in part on the generated data for new frame encoding.

2. The computer-implemented method of claim 1, further comprising: determining a change in shape of the at least one object between the first and second frames and including the determined change in the at least one object translation information.

3. The computer-implemented method of claim 1, further comprising: determining a change in color of the at least one object between the first and second frames and including the determined change in the at least one object translation information.

4. The computer-implemented method of claim 1, wherein a decoder is associated with a client computing device configured to render reconstructed frames to a user.

5. The computer-implemented method of claim 1, wherein the virtual camera translation information reflects the coordinates of the virtual camera in a 3D space defined by each frame and a direction of the camera in the 3D space defined by each frame.

6. The computer-implemented method of claim 1, further comprising: determining pixel velocity values based on the first and second positions of the virtual camera and assigning the determined pixel velocity values to the first portion of the first frame.

7. A computer-implemented method for encoding video content comprising a plurality of successive frames, the method comprising:
   obtaining, by one or more computer systems, a first data set defining a first frame of video content, and a second data set defining a second frame of video content immediately succeeding the first frame;
   determining virtual camera translation information based on a first position of a virtual camera associated with the first frame and a second position of the virtual camera associated with the second frame;
   determining information defining a first and second subsets of the first data set, the first subset defining a first portion of the first frame that overlaps with the second frame, the second subset defining a second portion of the first frame that does not overlap with the second frame, the information defining the first subset being determined based on the virtual camera translation information;
   determining information defining a subset of the second data set, the subset defining a first portion of the second frame that does not overlap with the first frame;
   encoding, by the one or more computer systems, a video file with the determined information,
   determining a frame degradation based on at least the virtual camera translation information;
   determining whether the frame degradation is above a threshold;
   when the frame degradation is above the threshold, transmitting the first frame as the second frame; and
   when the frame degradation is below the threshold, generating data for new frame encoding based at least in part on camera or object movement information and reconstructing the plurality of frames of video content based at least in part on the generated data for new frame encoding.

8. The computer-implemented method of claim 7, wherein determining information defining the first subset of the first data set includes assigning pixel velocity values to the first subset, the pixel velocity values being derived from the virtual camera translation information.

9. The computer-implemented method of claim 7, wherein the first position of the virtual camera comprises data defining a first viewpoint of the virtual camera that corresponds to the first frame.

10. The computer-implemented method of claim 9, wherein the data defining the first viewpoint comprises coordinates of the virtual camera in a 3D space defined by the first frame and a direction of the camera in the 3D space.

11. The computer-implemented method of claim 7, wherein the second position of the virtual camera comprises data defining a second viewpoint of the virtual camera that corresponds to the second frame.

12. The computer-implemented method of claim 11, wherein the data defining the second viewpoint comprises coordinates of the virtual camera in a 3D space defined by the second frame and a direction of the camera in the 3D space.

13. The computer-implemented method of claim 7, further comprising: determining that the first frame is the same as the second frame when the overlap between the first and second frames is determined to be above a first predetermined threshold.

14. The computer-implemented method of claim 7, further comprising: transmitting entire second frame of video content to a decoder when the overlap between the first and second boundaries is determined to be below a second predetermined threshold.

15. A computer system for encoding video content comprising a plurality of frames in a video game environment, the system comprising a processor and a memory having computer-executable instructions that, when executed on the processor, cause the processor to:
obtain a first data set defining a first frame of video content, the first data set including a subset defining at least one object within the first frame;
determine a projected movement of the at least one object between the first frame and a second frame that is subsequent to the first frame based at least in part on a movement of the at least one object between at least two frames preceding the second frame;
determine object translation information based on the determined projected movement, the at least one object translation information defining a location of the at least one object in the second frame;
encoding a video file with the determined object translation information,
determining a frame degradation based on at least the virtual camera translation information;
determining whether the frame degradation is above a threshold;
when the frame degradation is above the threshold, transmitting the first frame as the second frame; and
when the frame degradation is below the threshold, generating data for new frame encoding based at least in part on camera or object movement information and reconstructing the plurality of frames of video content based at least in part on the generated data for new frame encoding.

16. The computer system of claim 15, wherein the computer-executable instructions that cause the processor to determine object translation information further cause the processor to derive velocity values from the projected movement and values defining the change of shape of the at least one object and to assign the derived values to the subset defining the at least one object.

17. The computer system of claim 16, wherein the computer-executable instructions further cause the processor to determine a change in color of the at least one object between the first and second frames and to include the determined change in the object translation information.

18. The computer system of claim 16, wherein the computer-executable instructions further cause the processor to determine a change in size of the at least one object between the first and second frames and to include the determined change in the object translation information.

19. The computer system of claim 16, wherein the computer-executable instructions further cause the processor to determine a difference between the first and second frames based on the determined projected movement and change of shape of the object and to provide information for the determined difference to the decoder for reconstruction of the second frame.

20. The computer system of claim 19, wherein the computer-executable instructions that cause the processor to determine a difference between the first and second frames based on the determined projected movement and change of shape of the object further cause the computer to determine a space occupied by the object in the first frame and vacated by the object in the second frame and to determine data needed to fill the vacated space in the second frame.

21. The computer system of claim 15, wherein the computer-executable instructions further cause the processor to determine a projected change of shape of the at least one object between the first frame and the second frame based at least in part on the movement of the at least one object between the at least two frames preceding the second frame and include the projected change of shape of the at least one object in the object translation information.

22. A non-transitory computer-readable storage medium having computer-executable instructions for encoding video content comprising a plurality of frames recorded by a camera in real time stored thereon that, when executed by a computer, cause the computer to:
obtain information for a first frame of video content and a second frame of video content immediately succeeding the first frame;
obtain camera translation information based on a movement of a camera between the first and second frames;
determine information indicating a difference between the first and second frames based on the camera translation information;
encode a video file with the determined information,
determine a frame degradation based on at least the virtual camera translation information;
determine whether the frame degradation is above a threshold;
when the frame degradation is above the threshold, transmit the first frame as the second frame; and
when the frame degradation is below the threshold, generating data for new frame encoding based at least in part on camera or object movement information and reconstructing the plurality of frames of video content based at least in part on the generated data for new frame encoding.

23. The non-transitory computer-readable storage medium of claim 22, wherein the instructions that cause the computer to obtain camera translation information further cause the computer to determine a difference between the coordinates of the camera associated with the first frame and the coordinates of the camera associated with the second frame and a difference between the camera direction associated with the first frame and the camera direction associated with the second frame.

24. The non-transitory computer-readable storage medium of claim 23, wherein the camera coordinates and direction are associated with information for each frame.

25. The non-transitory computer-readable storage medium of claim 23, wherein the camera coordinates for each frame are derived from the camera's physical location in a scene based on a position of one or more markers inserted in the scene.

26. The non-transitory computer-readable storage medium of claim 23, wherein the camera coordinates and direction for each frame are captured by a computer component associated with the camera.

27. The non-transitory computer-readable storage medium of claim 23, wherein the camera direction for each frame is supplied by an angle-measuring device associated with the camera.

28. The non-transitory computer-readable storage medium of claim 27, wherein the angle-measuring device is a gyroscope.

* * * * *